United States Patent [19]

Galloway, Jr.

[11] Patent Number: 4,626,237
[45] Date of Patent: Dec. 2, 1986

[54] METHOD AND APPARATUS FOR SEPARATING THE COMPONENTS OF A WELLSTREAM

[75] Inventor: Jimmie G. Galloway, Jr., Missouri City, Tex.

[73] Assignee: Exxon Production Research Co., Houston, Tex.

[21] Appl. No.: 680,101

[22] Filed: Dec. 10, 1984

[51] Int. Cl.$^4$ ............................................. B01D 21/26
[52] U.S. Cl. ........................................ 494/37; 494/44
[58] Field of Search ..................... 494/37, 25, 31, 44; 210/782, 784, 781, 188

[56] References Cited

U.S. PATENT DOCUMENTS

| | | |
|---|---|---|
| 355,050 | 12/1886 | Backstrom . |
| 1,712,184 | 5/1929 | Wendel ................................ 494/44 |
| 1,782,467 | 11/1930 | Greig . |
| 2,067,590 | 1/1937 | Ayers.. |
| 2,800,493 | 7/1957 | Stein . |
| 3,860,167 | 1/1975 | Lascoux . |
| 4,378,285 | 3/1983 | Hunter . |

FOREIGN PATENT DOCUMENTS

| | | |
|---|---|---|
| 1136061 | 11/1982 | Canada . |
| 1142455 | 3/1983 | Canada . |
| 1143293 | 3/1983 | Canada . |
| 0082630 | 6/1983 | European Pat. Off. . |
| 929229 | 5/1982 | U.S.S.R. . |

OTHER PUBLICATIONS

"The Gas Centrifuge", Olander, Scientific American, Aug. 1978, pp. 37–43.

Primary Examiner—Robert W. Jenkins
Attorney, Agent, or Firm—K. C. Johnson

[57] ABSTRACT

The present invention is a centrifuge method and apparatus for separating the components of a stream, particularly a wellstream. Centrifugal force is used to separate solid and liquid components from gaseous components, and the combined action of centrifugal force and countercurrent flow is used to separate a first liquid, such as crude oil, from a second liquid, such as water. In addition, the combined action of centrifugal force and countercurrent flow can be used to separate a heavy gas, such as carbon dioxide, from a light gas, such as hydrocarbon gas.

18 Claims, 8 Drawing Figures

METHOD AND APPARATUS FOR SEPARATING THE COMPONENTS OF A WELLSTREAM

FIELD OF THE INVENTION

The present invention relates to the separation of solids, liquids and gases. More particularly, the present invention relates to a centrifuge method and apparatus for separating the components of a wellstream.

BACKGROUND OF THE INVENTION

In the petroleum industry, wells are drilled into subsurface formations to recover hydrocarbons contained therein. A single formation typically contains a wide variety of hydrocarbons, including gaseous hydrocarbons such as methane and liquid hydrocarbons such as octane. These hydrocarbons are often associated in the formation with nonhydrocarbons such as sand, water and carbon dioxide. The hydrocarbon and nonhydrocarbon components of the subsurface formation are produced as a wellstream which flows to the surface through the well.

Before the hydrocarbons being produced by the well can be marketed, they must generally be separated from the other components of the wellstream. In addition, the liquid hydrocarbons must generally be separated from the gaseous hydrocarbons due to the different handling requirements and end uses for each. The resulting liquid hydrocarbon stream is referred to as a crude oil stream and the resulting gaseous hydrocarbon stream is referred to as a natural gas stream. Often, the crude oil stream and natural gas stream are introduced into separate common carrier pipelines for transportation to shipping facilities, refineries, chemical plants or sites of commercial and residential use. Before the crude oil and natural gas from the well can be introduced into their respective common carrier pipelines, they must first meet certain standards established by the common carrier. For example, the crude oil may be permitted to contain no more than a very small percentage of water and particulates, and the natural gas may be permitted to contain only a very small percentage of water vapor. These restrictions are aimed at keeping relatively uniform streams of crude oil and natural gas in the pipelines.

Even in the absence of common carrier requirements, practicalities often necessitate separate and relatively uncontaminated streams of crude oil and natural gas. For example, crude oil produced from offshore platforms is commonly loaded onto tankers for transportation, and natural gas is commonly sent via dedicated underwater pipelines to facilities on land. If water is being produced along with the crude oil, it is usually desirable to dispose of the water before the crude oil is loaded onto the tanker, so that tanker capacity is not wasted. Likewise, if substantial quantities of carbon dioxide are being produced along with the natural gas, it is usually desirable to separate the carbon dioxide from the natural gas so that the carbon dioxide can be disposed of at the offshore platform, thereby reserving pipeline capacity for transportation of the natural gas alone.

For these reasons and others, much effort and expense has gone into the development of systems which separate wellstream components. Many separation systems take advantage of the immiscibility and difference in densities of the various wellstream components, and make use of the force of gravity to provide the desired separation. For example, wellstreams are commonly introduced into separators, which are basically large tanks which have outlet lines for the various components at different vertical positions. After the wellstream is introduced into the separator, it is allowed to sit for a substantial period of time so that the force of gravity can cause the heavier components to settle to the bottom. Typically, the wellstream will thereby be separated into a water fraction at the bottom of the separator, a crude oil fraction at the middle and a gaseous fraction at the top. Due to the time it takes for gravity to achieve this separation, separators are usually quite large and very heavy when full.

While the force of gravity can be sufficient to separate water, crude oil and gas from one another, it is generally not sufficient to separate nonhydrocarbon gases from natural gas. To achieve this kind of separation, the gas fraction from the separator is commonly sent into a separation system which relies on differences in the physical and/or chemical properties of the various gaseous components. Systems which rely on differences in physical properties generally cause one or more of the gaseous components to separate from the remainder via liquefaction, which is induced by pressure and cooling. The compressors and heat exchangers used by such systems are usually large, heavy and expensive. Separation systems which rely on differences in the chemical properties of the various gaseous components, such as glycol separation systems, are also generally large, heavy and expensive.

The cost of the processing facilities needed to separate the components of wellstreams coming from one or more wells can constitute a major portion of the expense needed to bring a petroleum field into production. In the case of offshore petroleum fields, this problem is compounded by weight and space limitations. The more space the processing facilities require, and the more they weigh, the greater the expense required to design, construct, and deploy an offshore platform with the size and strength needed to support the facilities. For these reasons and others, it would be highly advantageous to have a separation system which is smaller, lighter and less expensive than those which are currently in existence. The present invention is aimed at providing such a system.

SUMMARY OF THE INVENTION

Briefly, the present invention is a centrifuge method and apparatus for separating the components of a stream, particularly a wellstream. In a first embodiment, the wellstream is fed through a centerpost into a centrifuge having a primary rotor and an inner rotor which is attached to the primary rotor for rotation therewith. The wellstream first enters the inner rotor, which removes sand and other particulates. The remaining components of the wellstream flow out of the inner rotor and into the primary rotor where they are separated by the combined action of centrifugal force and countercurrent flow. Water is extracted through water scoops positioned near the bottom of the primary rotor. Crude oil and natural gas are extracted through separate scoops positioned near the top of the primary rotor.

In a second embodiment, only a single rotor is used. Sand and other particulates are extracted along with water through scoops located near the bottom of the rotor and crude oil is extracted through scoops located near the top of the rotor. Two pair of gas scoops are provided, one near the top of the rotor to extract light gas, such as natural gas, and one near the bottom of the rotor to extract heavy gas, such as carbon dioxide.

DESCRIPTION OF THE PREFERRED EMBODIMENTS

Figure 1:
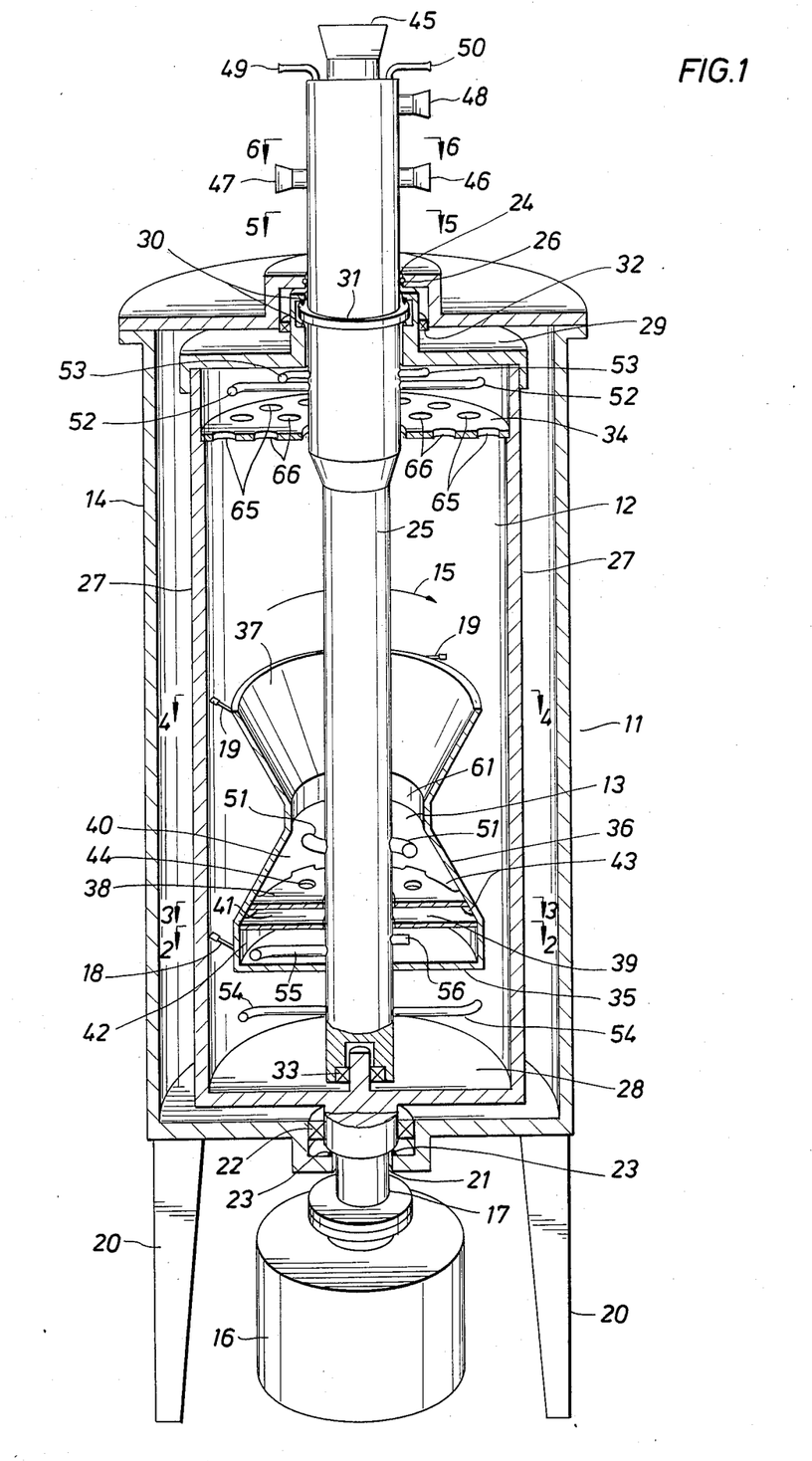
FIG. 1 is an elevational view, partly in section, of a first embodiment of the centrifuge apparatus of the present invention.

FIG. 1 shows an elevational view, partly in section, of a first embodiment of the centrifuge apparatus of the invention. Centrifuge 11 is designed to separate the components of a wellstream. For example, a wellstream containing water, crude oil, natural gas and particulates such as sand can be separated by the centrifuge into four individual streams, thereby facilitating marketing of both the crude oil and natural gas, and disposal of both the water and sand.

Separation is achieved by virtue of two rotors, primary rotor 12 and inner rotor 13, which rotate together at very high speeds within the protective enclosure of stationary containment vessel 14. The direction of rotation is shown by arrow 15. To give a perspective of size, consider that in an operation requiring the processing of five to ten thousand barrels of wellstream per day, the primary rotor might be on the order of 6 feet (2 meters) in length and 2.5 feet (0.8 meters) in diameter. The primary rotor is driven by high speed electric motor 16, which is attached to the primary rotor by drive shaft 17. The inner rotor is attached to the primary rotor by spokes 18 and 19 for rotation therewith. The principal functions of the inner rotor are to separate sand and other particulates from the wellstream and to accelerate the remaining wellstream components into the primary rotor. These remaining components are separated from one another in the primary rotor.

Containment vessel 14 is essentially cylindrical in shape and is supported by legs 20. Alternatively, the containment vessel could be wall-mounted. The primary rotor is rotated within the containment vessel by drive shaft 17, which extends through opening 21 in the bottom end of the containment vessel. Bearing 22 permits rotation of the drive shaft and keeps the drive shaft properly aligned. Mechanical contact seal 23 engages the drive shaft and seals the lower end of the containment vessel to prevent gases from leaking in or out. The top end of the containment vessel has opening 24 through which centerpost 25 passes, and this opening is sealed by seal 26.

The sealed containment vessel is charged with an inert gas such as helium to prevent the formation of an explosive mixture therein. Such a mixture might otherwise result if natural gas were to inadvertently leak into the containment vessel from the primary rotor and mix with air. An alternative to charging the containment vessel with inert gas would be to evacuate the containment vessel. This would result in added expense, but the added expense would be at least partially offset by energy savings resulting from less aerodynamic drag on the primary rotor.

Primary rotor 12 is essentially cylindrical in shape and is comprised of primary rotor wall 27, bottom end cap 28 and top end cap 29. The bottom end cap is solid and is attached to drive shaft 17. The top end cap has an opening through which centerpost 25 extends. Double mechanical contact seal 30 is attached to the top end cap and engages both sides of seal ring 31, which surrounds the centerpost. This arrangement permits rotation of the top end cap around the stationary centerpost while preventing leakage into or out of the primary rotor. Bearing 32 supports the weight of the primary rotor, keeps the top end of the primary rotor properly aligned, and permits the primary rotor to rotate within the stationary containment vessel. Bearing 33 at the bottom end of the primary rotor keeps centerpost 25 properly aligned and allows the centerpost to remain stationary during rotation of the primary rotor. The only centrifuge elements which rotate with the primary rotor are primary rotor baffle 34 and inner rotor 13, neither of which contact the centerpost.

The inner rotor rotates along with the primary rotor due to the fact that it is attached thereto by spokes 18 and 19. The inner rotor is shaped as shown in FIG. 1 and is comprised of bottom plate 35, frustoconically shaped inner rotor wall 36, frustoconically shaped lip 37, inner rotor top baffle 38 and inner rotor bottom baffle 39. The top baffle is annular in shape and separates upper chamber 40 of the inner rotor from middle chamber 41. The bottom baffle is also annular in shape, and it separates middle chamber 41 from bottom chamber 42. Neither the top baffle nor the bottom baffle contact the centerpost, and both are provided with slots 43 which permit the passage of sand, as will be explained below. In addition, the top baffle is provided with holes 44 which permit crude oil which is stripped from sand particles in the middle chamber to pass into the upper chamber, as will be explained below. Although a frustoconically shaped inner rotor wall is preferred, other shapes can also be utilized, provided the inner rotor wall has a radially larger portion and a radially smaller portion, with the radially larger portion serving to separate sand and other particulates from the wellstream being processed.

All flow into and out of the centrifuge occurs through centerpost 25. The wellstream flows into the centerpost through feed flange 45, and the separated crude oil, water, natural gas and sand respectively flow out of the centerpost through oil flange 46, water flange 47, gas flange 48 and sand flange 49. Makeup water, the need for which is explained below, flows into the centrifuge through makeup water flange 50.

The wellstream is injected into upper chamber 40 of the inner rotor through feed nozzles 51, which are positioned on opposite sides of the centerpost and which are curved in the direction of rotation. Near the top of the primary rotor are oil scoops 52 and gas scoops 53, which respectively function to remove the separated crude oil and natural gas from the primary rotor. Separated water is removed near the bottom of the primary rotor by water scoops 54. The paired oil, gas and water scoops are positioned on opposite sides of the centerpost and are curved opposite the direction of rotation of the primary rotor. Positioning the scoops on opposite sides of the centerpost reduces wear on bearings and seals by minimizing lateral displacement forces imposed on the stationary centerpost by the rapidly rotating fluids in the centrifuge. This is because the lateral displacement force acting on one scoop tends to be cancelled by the force acting in the opposite direction on the other scoop. Primary rotor baffle 34 separates the oil scoops and gas scoops from lower portions of the primary rotor, thereby preventing these scoops from interfering with the countercurrent flow, which will be explained below.

Extending from opposite sides of the centerpost into lower chamber 42 of the inner rotor are sand scoop 55 and makeup water nozzle 56. Like all other scoops, the sand scoop is curved opposite the direction of rotation. The sand scoop is used to remove sand which collects in the lower chamber, and the makeup water nozzle is used to inject makeup water into the lower chamber, thereby maintaining a level of water in the inner rotor which extends to the level of top baffle 38. Makeup water is injected because some water is removed from the lower chamber by the sand scoop. Further details regarding the structure of the inner rotor and the centerpost will now be explained with reference to the cross-sectional views shown in FIGS. 2, 3, 4, 5 and 6.

Figures 2, 3, 4:
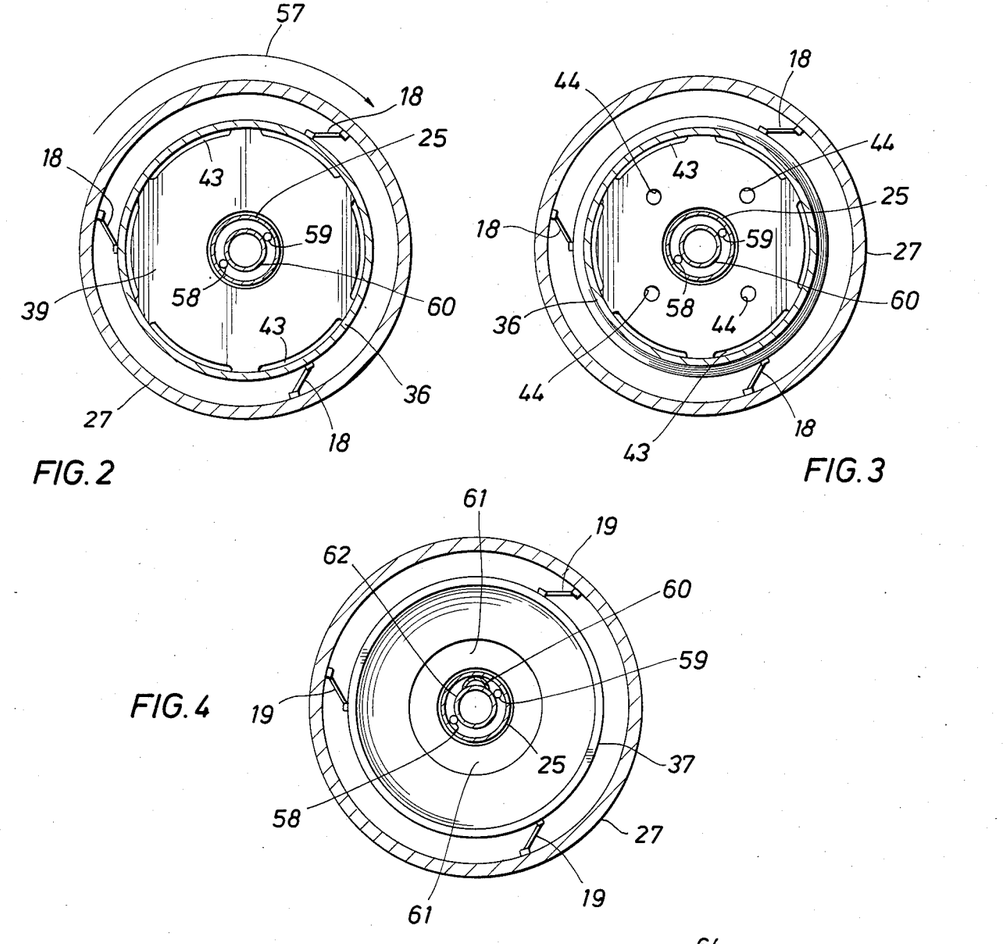
FIG. 2 is a cross-sectional view taken along lines 2—3 of FIG. 1.
FIG. 3 is a cross-sectional view taken along line 3—3 of FIG. 1.
FIG. 4 is a cross-sectional view taken along line 4—4 of FIG. 1.

FIG. 2 is a cross-sectional view taken along line 2—2 of FIG. 1, which extends through the primary rotor, inner rotor and centerpost just above the level of the inner rotor's lower baffle. As can be seen, inner rotor wall 36 is attached to primary rotor wall 27 by three spokes 18. As the primary rotor rotates in the direction of arrow 57, it pulls on the spokes, thereby causing the inner rotor to rotate with the primary rotor. The tangential arrangement of the spokes causes them to be in a state of tension during operation of the centrifuge. This arrangement minimizes compressional and shear forces which would otherwise have a tendency to buckle or bend the spokes.

Lower baffle 39, which separates the middle and lower chambers of the inner rotor, is attached to the inner rotor wall, but does not contact centerpost 25. Slots 43 in the lower baffle permit sand to flow from the middle chamber to the lower chamber for removal by the sand scoop. Sand conduit 58 is located within the centerpost and links the sand scoop to the sand flange. At the level shown in FIG. 2, there are two other conduits within the centerpost, makeup water conduit 59 and water conduit 60. The makeup water conduit connects the makeup water nozzle to the makeup water flange, and the water conduit connects the water scoops to the water flange.

FIG. 3 is a cross-sectional view taken along line 3—3 of FIG. 1, which extends through the primary rotor, inner rotor and centerpost just above the level of the inner rotor's upper baffle. This figure shows in more detail the slots and holes in the upper baffle. Slots 43 in the upper baffle permit sand to flow from the upper chamber of the inner rotor to the middle chamber. Holes 44 in the upper baffle allow crude oil which is stripped from the sand passing through the water-filled middle chamber to float upward into the upper chamber.

FIG. 4 is a cross-section view taken along line 4—4 of FIG. 1, which extends through the primary rotor and centerpost at a level just above the inner rotor lip. As can be seen, the top of inner rotor lip 37 is attached to primary rotor wall 27 by three tangential spokes 19. Annular space 61 between the inner rotor and centerpost 25 provides an opening for the wellstream to flow out of the upper chamber of the inner rotor and into the primary rotor. At the level shown in FIG. 4, the centerpost contains four conduits, sand conduit 58, makeup water conduit 59, water conduit 60 and feed conduit 62. The feed conduit connects the feed flange to the feed nozzles. The other conduits have been described above. It will be noted that the feed conduit occupies the central portion of the centerpost at the level shown in FIG. 4, whereas the water conduit occupies the central portion of the centerpost at the levels shown in FIGS. 2 and 3. The transition of water conduit 60 from the central portion of the centerpost as shown in FIGS. 2 and 3 to the peripheral portion as shown in FIG. 4 occurs in the centerpost between the level of the upper baffle and the feed nozzles.

Figure 5:
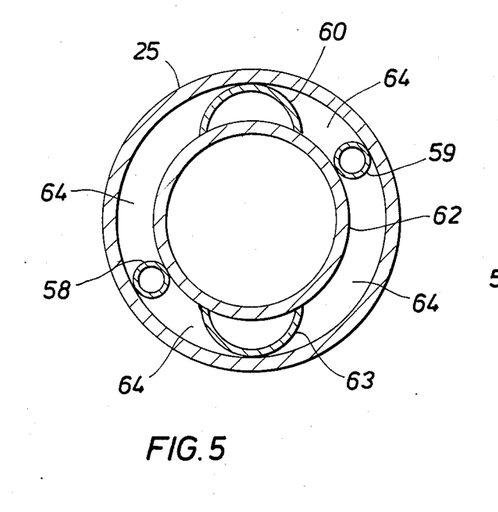
FIG. 5 is a cross-sectional view taken along line 5—5 of FIG. 1.

FIG. 5 is a cross-sectional view taken along line 5—5 of FIG. 1, which extends through the centerpost just below the level of the oil flange and the water flange. The cross-section of centerpost 25 at this level is similar to the cross-section of the centerpost shown in FIG. 4. The positions of sand conduit 58, makeup water conduit 59, feed conduit 62 and water conduit 60 are essentially the same. However, FIG. 5 shows an additional conduit, oil conduit 63, which connects the oil scoops to the oil flange. It is used to remove crude oil which is separated from the wellstream by the centrifuge. Natural gas, which is removed from the primary rotor by the gas scoops, flows to the gas flange through space 64 which surrounds the conduits within the centerpost.

Figure 6:
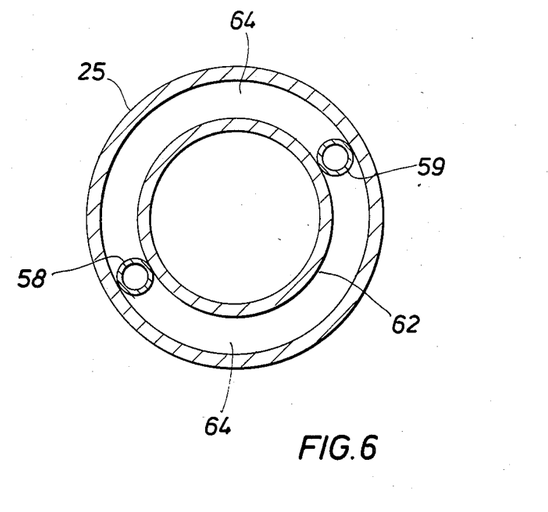
FIG. 6 is a cross-sectional view taken along line 6—6 of FIG. 1.

FIG. 6 is a cross-sectional view taken along line 6—6 of FIG. 1, which extends through centerpost 25 just above the level of the oil flange and the water flange. Since the oil conduit and the water conduit terminate respectively at the oil flange and water flange, they are not present in the centerpost at the level shown in FIG. 6. The only remaining conduits are sand conduit 58, makeup water conduit 59 and feed conduit 62. As explained above with reference to FIG. 5, natural gas flows through space 64 in the centerpost.

Having described the structure of the first embodiment of the present invention, the method by which the centrifuge separates the wellstream components will now be discussed with reference to FIG. 1.

After flowing into the centrifuge through feed flange 45, the wellstream is injected through feed nozzles 51 into upper chamber 40 of the rapidly rotating inner rotor. As the wellstream fills the upper chamber, the rotation of the inner rotor causes sand and other dense particulate components to flow outward into contact with frustoconically shaped inner rotor wall 36. Centrifugal forces then causes the sand to flow downward along the outwardly sloping inner rotor wall. The optimum angle of slope for the inner rotor wall will depend on a number of factors, includng the particle size of the sand, but the angle should typically be between 20 and 30 degrees from the axis of rotation. When the sand flows down to the level of upper baffle 38, it passes through slots 43 therein and enters middle chamber 41. The middle chamber is filled with water, as will be explained below, which functions to strip residual crude oil adhering to the sand. Since the residual crude oil is less dense than the water in the middle chamber, it is displaced inward and floats upward through holes 44 in the upper baffle. The residual crude oil stripped from the sand thus rejoins the wellstream in upper chamber 40.

After being cleansed of residual crude oil in the middle chamber, the sand continues flowing under the influence of centrifugal force downward along the outwardly sloping inner rotor wall. When the sand reaches the level of lower baffle 39, it passes through slots 43 and enters lower chamber 42 of the inner rotor for removal by sand scoop 55, which extends outward from the centerpost to a position adjacent to the inner rotor wall. As the sand scoop removes sand from the lower chamber, it will also remove some water, and both will flow out of the centrifuge through the sand conduit inside centerpost 25.

As described above, the lower and middle chambers of the inner rotor are filled with water so that residual crude oil can be stripped from the sand as it flows through the middle chamber. Since some of this water is removed from the lower chamber by the sand scoop, makeup water is added to maintain the level of water in the middle chamber. This makeup water is injected into the lower chamber through makeup water nozzle 56.

While the lower and middle chambers of the inner rotor are occupied primarily by sand and makeup water, the upper chamber of the inner rotor is occupied primarily by the wellstream. As explained above, the wellstream is injected into upper chamber 40 through feed nozzles 51. Once the upper chamber becomes filled with the wellstream during startup, essentially all wellstream components except for sand and other dense particulates will exit the upper chamber by flowing upward through annular space 61 between inner rotor 13 and centerpost 25. As they flow through the annular space, the wellstream components are quickly accelerated by the rotation of inner rotor lip 37 and are thus thrown out of the inner rotor and into the primary rotor.

The difference in densities of the liquid and gaseous components of the wellstream results in a rapid radial separation. If the wellstream components exiting the inner rotor are water, crude oil and natural gas, the low density natural gas will occupy the innermost portion of the primary rotor and the much higher density water and crude oil will flow outward to form a relatively thin liquid layer which occupies the outermost portion of the primary rotor, adjacent to primary rotor wall 27. The liquid layer and the natural gas will be separated by a liquid/gas interface which is maintained by the high centrifugal force within the primary rotor. The centrifugal force is highest near the primary rotor wall, and drops off exponentially toward the centerpost. The radial profile of the centrifugal force causes the liquid/gas interface to form within a few inches of the primary rotor wall under normal operating conditions, which places the interface between the primary rotor wall and the outermost portions of the inner rotor.

The high centrifugal force created by the rapidly spinning primary rotor acts essentially alone to separate the liquid components of the wellstream from the gaseous components, but it is only one of two mechanisms which result in separation of the liquid components of the wellstream from one another. The other mechanism is countercurrent flow, which acts in concert with the high centrifugal force to provide rapid separation of the liquid components and hence high throughput rates.

The countercurrent flow pattern has a cross-sectional profile which is directed downward adjacent to the primary rotor wall and upward adjacent to the liquid/gas interface. The rotation of the liquid layer and the countercurrent flow within the liquid layer combine to create a helical flow pattern when viewed in three dimensions. A brief glance at arrows 74 in FIG. 7 will give a rough idea of the cross-sectional profile of the countercurrent flow in the liquid layer.

Returning to FIG. 1, countercurrent flow is induced by stationary water scoops 54, which extend outward from opposite sides of centerpost 25 to positions adjacent to the bottom portion of primary rotor wall 27, and by rotating primary rotor baffle 34, which is located near the top of the primary rotor. The stationary water scoops impose a drag on the rapidly rotating liquid layer, thus reducing the rotational velocity of the liquid wellstream components contained therein. In order to conserve angular momentum, the liquid components flow inward toward the centerpost. As the liquid components approach the liquid/gas interface, they enter a region where pressure decreases in the upward direction. As a result, the liquid components turn and flow toward the top of the primary rotor, adjacent to the interface. When the liquid components reach the top portion of the primary rotor, they come into contact with primary rotor baffle 34. This rapidly rotating baffle increases the rotational velocity of the liquids, thus forcing them to flow outward toward the primary rotor wall in order to conserve angular momentum. As the liquid components approach the primary rotor wall they enter a region where pressure decreases in the downward direction. As a result, the liquid components turn and flow downward along the primary rotor wall to the bottom portion of the primary rotor, thus completing the countercurrent flow cycle.

Countercurrent flow results in an axial separation of the liquid components of the wellstream. If crude oil and water are the primary liquid components, the crude oil will be transported to the top of the primary rotor for removal by oil scoops 52 and the water will be transported to the bottom of the primary rotor for removal by water scoops 54. Holes 65 in primary rotor baffle 34 permit the crude oil to flow through the baffle and into the oil scoops, which extend outward from opposite sides of the centerpost to positions adjacent to the primary rotor wall.

Axial separation of the crude oil and water takes place as follows. As the wellstream flows out of the inner rotor and into the primary rotor, the gaseous components thereof will rapidly break away from the liquid components and will remain interior to the liquid/gas interface. The liquid crude oil and water components on the other hand will cross the interface, and upon doing so, will begin to flow upward into the liquid layer due to the upwardly directed countercurrent flow adjacent to the interface. As the crude oil and water move upward adjacent to the interface, the water will be subjected to a greater centrifugal force than the crude oil due to its higher density. This forces the water outward toward the primary rotor wall, where the direction of countercurrent flow is downward toward the water scoops. Due to its lower density, the crude oil remains in the inner portions of the liquid layer and flows upward to the oil scoops. Any crude oil which happens to reach the vicinity of the primary rotor wall will be displaced inward by the water, and will rejoin the upwardly directed countercurrent flow stream adjacent to the liquid/gas interface.

The axial separation of the liquid components of a wellstream in accordance with the present invention is to be contrasted with radial separation. Centrifuges which rely on radial separation must generally maintain an interface between the separated liquid components at a precise radial position so that they can be removed individually. This can be especially difficult to achieve in the separation of liquid wellstream components, because the composition and flow rate of a wellstream will commonly fluctuate over relatively short time intervals. The countercurrent flow and resulting axial separation of the centrifuge method and apparatus of the present invention can more readily tolerate these fluctuations. Countercurrent flow also provides a better mechanism for mass transfer, thus resulting in more efficient and thorough separation.

Optimization of the countercurrent flow pattern and countercurrent flow velocity is achieved through proper design of the water scoops and primary rotor baffle. The velocity should be sufficiently low to permit the wellstream components to separate and sufficiently high to yield efficient throughput rates. The optimum design for the water scoops and primary rotor baffle will depend on the composition of the wellstream being processed. For example, a wellstream containing a high percentage of water will require larger water scoops than a wellstream containing little water. It is possible that for some high water content wellstreams, the water scoops will need to be too large to achieve optimum countercurrent flow. This can be remedied by positioning a second rotating primary rotor baffle (not shown) similar to primary rotor baffle 34 just above the level of the water scoops. The second baffle prevents the water scoops from interfering with countercurrent flow. A pair of stationary bars (not shown) extendng outward from opposite sides of the centerpost could be installed just above the second baffle to drive the countercurrent flow. Since these bars would serve only one purpose, they could be designed to produce optimum countercurrent flow.

As described above, the liquid layer occupies only the outermost portion of the primary rotor. In order to avoid disturbance of countercurrent flow within the liquid layer, obstructions to flow need to be minimized in this region of the primary rotor. For this reason, inner rotor wall 36 and inner rotor lip 37 do not extend into the liquid layer region, and spokes 18 and 19 which attach the inner rotor to the primary rotor are made relatively small.

Unlike the axial separation of the liquid components of the wellstream from one another, the gaseous components are radially separated from the liquid components. The gaseous components occupy the innermost portion of the primary rotor and are removed through gas scoops 53, which extend outward a relatively short distance from opposite sides of the centerpost above primary rotor baffle 34. Oil scoops 52 on the other hand extend from opposite sides of the centerpost to positions adjacent to the primary rotor wall. Thus, the radial position of the liquid/gas interface can undergo relatively large fluctuations without resulting in gas flowing into the oil scoops or crude oil flowing into the gas scoops. Holes 66 in the primary rotor baffle permit the gaseous components to flow from feed nozzles 51 to the gas scoops.

Figure 7:
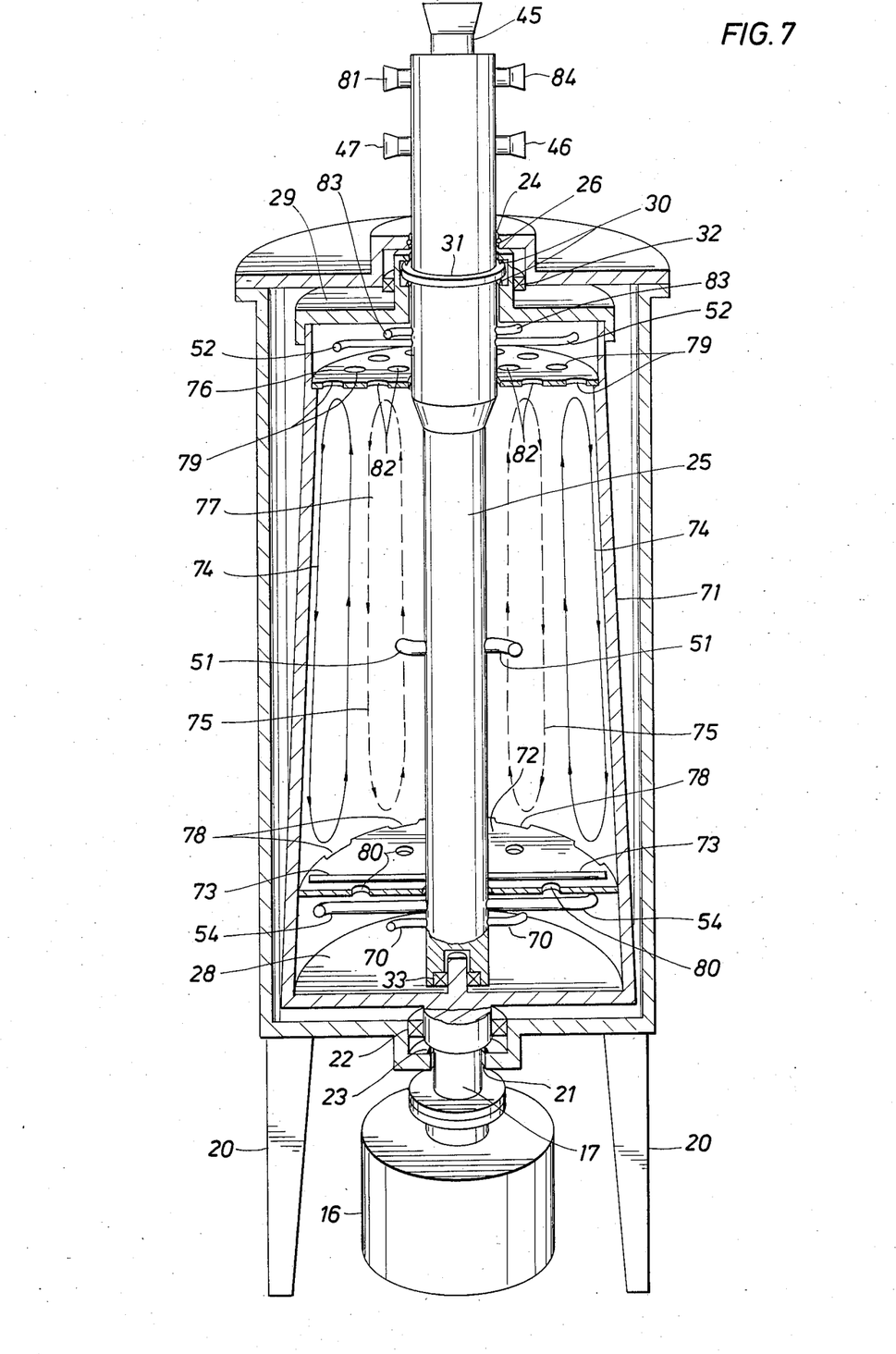
FIG. 7 is an elevational view, partly in section, of a second embodiment of the centrifuge apparatus of the present invention.

With the method of the present invention, it may even be possible to separate the gaseous components of a wellstream from one another. Consider a wellstream which contains a high percentage of carbon dioxide in addition to natural gas. By separating the carbon dioxide from the natural gas in the same centrifuge used to separate the sand, crude oil, water and gaseous components from one another, additional wellstream processing equipment could be eliminated, thus reducing cost. FIG. 7 displays a second embodiment of the present invention which is intended to achieve this type of separation.

Many elements of the centrifuge shown in FIG. 7 are the same as the elements of the centrifuge shown in FIG. 1, and will not be redescribed. These elements bear the same numbers in both figures. By comparing the two figures, it will be noted that the centrifuge of FIG. 7 lacks an inner rotor, a sand scoop and a makeup water nozzle, includes a second pair of gas scoops 70, and has a frustoconically shaped rotor wall 71. As will be recalled, the primary rotor wall of the centrifuge shown in FIG. 1 was cylindrical in shape. The centrifuge shown in FIG. 7 also includes rotating lower baffle 72 and stationary bars 73.

The centrifuge shown in FIG. 7 is intended for the processing of a wellstream which contains a relatively low concentration of sand and other particulates, a relatively high concentration of water, and a relatively high concentration of carbon dioxide or other heavy nonhydrocarbon gas, in addition to crude oil and natural gas. The low concentration of sand permits elimination of the inner rotor, sand scoop and makeup water scoop. The high concentration of water necessitates the use of large water scoops 54, too large to provide optimum countercurrent flow, thus requiring the addition of rotating lower baffle 72 and stationary bars 73. The stationary bars provide a driving force for countercurrent flow by creating a drag on fluids rotating within the centrifuge. The lower baffle prevents the water scoops from interfering with the countercurrent flow pattern, which is depicted by arrows 74 and 75. Upper baffle 76 corresponds to the primary rotor baffle shown in FIG. 1.

Consider a wellstream containing sand, water, crude oil, natural gas and carbon dioxide. The wellstream is injected into the centrifuge through feed nozzles 51 and is accelerated by the spinning rotor. Due to their low densities, the natural gas and carbon dioxide will rapidly break away from the other components of the wellstream and will remain in innermost portion of rotor 77, while the heavier sand, water and crude oil will flow into the outermost portion, thus establishing a liquid layer adjacent to rotor wall 71. The liquid layer will be separated from the gaseous components by a liquid/gas interface. Sand, being the heaviest component in the liquid layer, will be forced into contact with the rotor wall. Due to the frustoconical shape of the rotor wall, the sand will flow in a downward direction, in the same manner that it flowed downward along the frustoconically shaped inner rotor wall of the centrifuge shown in FIG. 1. As the sand flows downward, it passes through slots 78 in the lower baffle and is removed by water scoops 54. Although a frustoconically shaped rotor wall is preferred, other shapes can also be utilized, provided the rotor wall has a radially larger portion and a radially smaller portion, with the radially larger portion serving to separate sand and other particulates from the wellstream being processed.

The water and crude oil in the liquid layer will be axially separated from each other by the combined action of centrifugal force and countercurrent flow, in the same manner described above with reference to the first centrifuge embodiment. Solid arrows 74 indicate the cross-section of the countercurrent flow pattern within the liquid layer. As a result of the countercurrent flow, the water flows downward along the rotor wall, through slots 78 in the lower baffle and into water scoops 54. Crude oil on the other hand flows upward adjacent to the liquid/gas interface, through holes 79 in upper baffle 76 and into oil scoops 52.

Just as centrifugal force and countercurrent flow combine to provide an axial separation of the water and crude oil in the liquid layer, so too do they combine to provide an axial separation of the carbon dioxide and natural gas. Broken arrows 75 indicate the cross-section of the countercurrent flow pattern of these gaseous components. The countercurrent flow of the gaseous components is driven in the same manner as the countercurrent flow in the liquid layer. Stationary bars 73 impose a drag on the rotating gaseous components, thus slowing them. In order to conserve angular momentum, the gaseous components flow inward toward centerpost 25. As the gaseous components approach the centerpost, they enter a region where pressure decreases in the upward direction. As a result, the gaseous components turn and flow upward, essentially parallel to the centerpost. When the gaseous components reach rapidly rotating upper baffle 76, their rotational speed is increased. This forces the gaseous components to flow outward toward the liquid/gas interface, which acts like a rotor wall with respect to the gaseous components and thus as a barrier to further outward motion. As the gaseous components approach the interface, they enter a region where pressure decreases in the downward direction. As a result, the gaseous components turn and flow downward adjacent to the interface until they reach stationary bars 73, thus completing the countercurrent flow cycle. Since the gaseous components are rapidly rotating as they undergo countercurrent flow, their actual three dimensional flow pattern is helical.

Due to its greater density, the carbon dioxide component is forced outward by centrifugal force to a greater extent than the natural gas component. As a result, the carbon dioxide flows into the area adjacent to the liquid/gas interface, where the direction of countercurrent flow is downward. This causes the carbon dioxide to flow downward adjacent to the interface, through holes 80 in the lower baffle and into heavy gas scoops 70 for removal from the centrifuge via heavy gas flange 81. On the other hand, the lighter natural gas will remain in the innermost portions of the rotor, where the direction of countercurrent flow is upward. Consequently, the natural gas will flow upward through holes 82 in the upper baffle and into light gas scoops 83 for removal via light gas flange 84.

It will be noted that the second centrifuge embodiment of FIG. 7 does not include a sand flange or a makeup water flange. This of course is due to elimination of the sand scoop and makeup water nozzle. Likewise, the centerpost of the second centrifuge embodiment does not contain a sand conduit or a makeup water conduit. It does however contain a heavy gas conduit (not shown) which connects heavy gas scoops 70 to heavy gas flange 81. Gas from the light gas scoops flows through the space (not shown) in the centerpost which surrounds the conduits (not shown) contained therein.

Thus, the second centrifuge embodiment has one inlet flange: the feed flange, and four outlet flanges: the oil flange, the water flange, the heavy gas flange and the light gas flange. In comparison, the first centrifuge embodiment shown in FIG. 1 has two inlet flanges: the feed flange and the makeup water flange, and four outlet flanges: the oil flange, the water flange, the gas flange, and the sand flange. In the operation of either embodiment, a control system is used to monitor and adjust output from the outlet flanges, thereby keeping the output streams within prescribed compositional limits. The design of the control system will depend primarily on the nature of the wellstream being processed, the compositional limits for the output streams, the design of the centrifuge and the desired throughput rate. To illustrate, FIG. 8 depicts a schematic diagram of a control system which is intended for use with the first centrifuge embodiment shown in FIG. 1.

Figure 8:
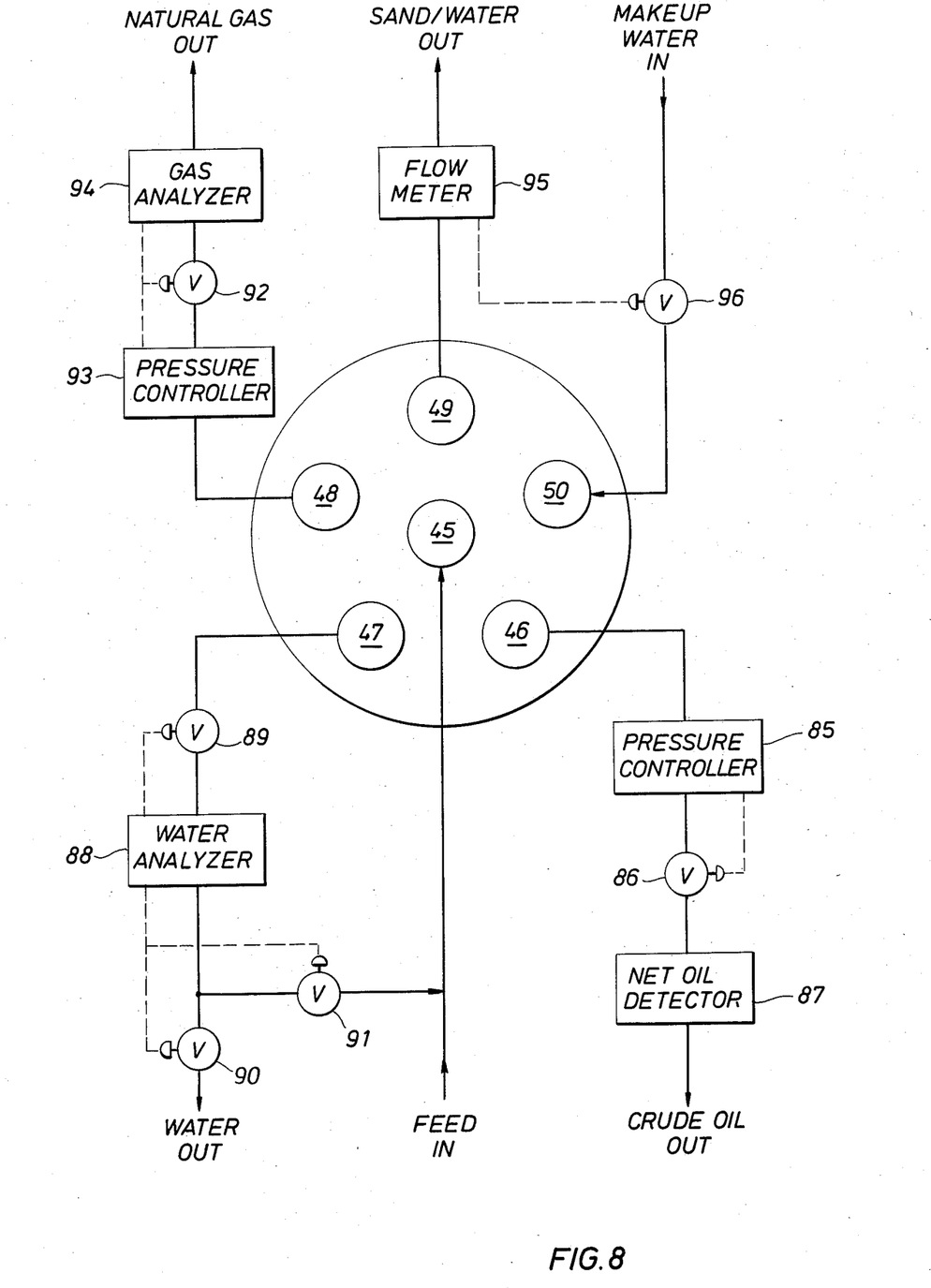
FIG. 8 is a schematic diagram of a control system for the first embodiment of the centrifuge apparatus of the present invention.

To a large extent, the control system depicted in FIG. 8 operates on the basis of pressure control. As will be recalled, the centrifugal force within the centrifuge increases exponentially with increasing radial distance from the centerpost. As a consequence, pressure within the centrifuge also increases exponentially with increasing radial distance from the centerpost. The actual pressure profile is determined by the densities, relative amounts and absolute amounts of the wellstream components within the centrifuge, and by the rotational velocity and radius of the primary rotor. One constraint which must be satisfied for operation of the centrifuge is that the pressure of the wellstream being processed must be greater than the pressure in the centrifuge at the radial distance from the centerpost where the feed nozzles terminate. This permits the wellstream to be injected into the centrifuge through the feed nozzles. In FIG. 8, the feed flange, oil flange, water flange, natural gas flange, sand flange and makeup water flange are respectively represented by circles 45, 46, 47, 48, 49 and 50.

An increase in the amount of liquid in the centrifuge will cause the pressure in the centrifuge to increase. This causes the pressure of the crude oil stream exiting the centrifuge through oil flange 46 to increase as well, and for a fixed orifice, causes increased flow. If oil pressure controller 85 senses an increase in pressure above a prescribed pressure which corresponds to the optimum amount of liquid in the centrifuge, and if the increase persists for a prescribed period of time, the oil pressure controller signals oil throttle valve 86 to open more. This permits more crude oil to flow out of the centrifuge, thereby decreasing the amount of liquid in the centrifuge to the optimum level. Net oil detector 87 is used to monitor the water content of the crude oil, but is not used as an active control.

Water analyzer 88 monitors the water stream exiting the centrifuge through water flange 47 to determine the percentage of residual crude oil in the water stream. An excessive percentage of residual crude oil represents a loss of valuable hydrocarbons and complicates disposal of the water. The percentage of residual crude oil will tend to increase with increasing flow because increasing flow decreases the time the wellstream components spend in the centrifuge, thereby decreasing separation efficiency.

The water analyzer controls three valves, water throttle valve 89, and recycling valves 90 and 91. If the percentage of residual crude oil in the water increases above a prescribed limit, and if the increase persists for a prescribed period of time, the water analyzer will signal the water throttle valve to close more, thereby decreasing flow. This brings the water back within specifications by increasing residence time, which increases separation efficiency, thereby reducing the percentage of residual crude oil. The decrease in flow also causes an increase in the amount of liquid in the centrifuge. As a result, pressure in the centrifuge increases, causing oil pressure controller 85 to signal oil throttle valve 86 to open more, thereby increasing the flow of crude oil through oil flange 46 and decreasing the quantity of liquid in the centrifuge to the optimum level, as described above. On the other hand, if the percentage of residual crude oil in the water stream drops well below the prescribed limit, water analyzer 88 signals water throttle valve 89 to open more, thereby increasing the flow of water through water flange 47. This will decrease the quantity of liquid in the centrifuge and will cause oil pressure controller 85 to signal oil throttle valve 86 to close more, thereby decreasing the flow of crude oil out of the centrifuge while at the same time increasing the amount of liquid in the centrifuge to the optimum level.

By maintaining the quality of the water stream and the quantity of liquid in the centrifuge as thus described, the centrifuge should be able to meet the specifications set for both the crude oil stream and the water stream. If both streams are off specification simultaneously, the design capacity of the centrifuge will have been exceeded.

Under certain conditions, such as startup, the percentage of residual crude oil in the water stream may be very high for a short period of time. This situation is accommodated by water analyzer 88 and recycling valves 90 and 91. Under normal operating conditions, recycling valve 90 is open and recycling valve 91 is closed. If the percentage of residual crude oil exceeds a prescribed maximum limit, the water analyzer signals recycling valve 90 to close and recycling valve 91 to open. This recycles the water stream back into the centrifuge with the feed stream for further separation. Once the temporary situation terminates and the percentage of residual crude oil falls below the prescribed maximum limit, the water analyzer signals recycling valve 90 to open and recycling valve 91 to close, thereby returning the system to the normal operating condition.

The flow of natural gas from gas flange 48 is controlled by gas throttle valve 92, which is regulated by gas pressure controller 93 and gas analyzer 94. If the gas pressure controller detects a decrease in pressure to a value below a prescribed limit, it signals the gas throttle valve to close more, thereby increasing gas pressure. If instead the gas pressure controller detects an increase in pressure to a value above the prescribed limit, it signals the gas throttle valve to open more, thereby decreasing gas pressure and increasing flow rate.

Increased flow rate means the natural gas spends less time in the centrifuge, which in some circumstances may result in the natural gas falling below specifications. If for this or any other reason the natural gas contains too high a percentage of contaminants, such as heavy hydrocarbons or water vapor, the gas analyzer will override any signal from the gas pressure controller and will cause the gas throttle valve to close more. This decreases flow, increases the residence time of the natural gas in the centrifuge and brings the natural gas back within specifications. Once the natural gas is back within specifications, the signal from the gas analyzer ceases and the gas pressure controller resumes regulation of the gas throttle valve. By controlling the composition of the natural gas stream in this manner, the vapor pressure of the crude oil stream will also be controlled.

A surge in the feed stream flow rate through feed flange 45 should normally be tolerated by the centrifuge as long as the surge is temporary and does not overfill the centrifuge with liquid wellstream components. The reaction times of the oil pressure controller and the gas pressure controller are intentionally made to be relatively slow, so that transient surges are ignored. If the feed stream flow rate remains at an increased level, the pressure controllers will cause the oil throttle valve and the gas throttle valve to open more, thereby increasing the flow of crude oil and natural gas out of the centrifuge. If the increased flow causes the crude oil and natural gas to fall below specifications for a prolonged period, the capacity of the centrifuge will have been exceeded. In such a case, the feed stream flow rate should be reduced. This can be accomplished for example by adjusting valves at the wellhead (not shown). Once the feed stream flow rate is returned to normal, the crude oil and natural gas streams should come back within specifications. Under normal operating conditions, the amount of feed flowing into the centrifuge will be roughly balanced by the amount of crude oil, natural gas, water and sand flowing out of the centrifuge.

The control system functions to provide one additional balance of flow into and out of the centrifuge. As will be recalled, the removal of sand from the inner rotor of the centrifuge by the sand scoop results in the removal of some water as well. For this reason, makeup water is injected back into the inner rotor through the makeup water nozzle. As sand and water flow out of the centrifuge through sand flange 49, flow meter 95 measures the rate of flow. In response to the rate of flow, the flow meter regulates makeup water valve 96, which controls the flow of makeup water into makeup water flange 50, thereby balancing the amount of water flowing out of the sand flange with makeup water. The normal flow rate of sand from the sand flange is taken into account in setting the control relationship between the flow meter and the makeup water valve. Typically, the control relationship will be set such that the flow rate of makeup water is slightly more than the average rate of water removal by the sand scoop. This provides a tolerance for slight fluctuations in the sand content of the wellstream. Any excess makeup water will flow through the holes in the upper baffle of the inner rotor and will join the feed stream in the inner rotor's upper chamber, causing no disruption of the centrifuge's operation.

For the second centrifuge embodiment shown in FIG. 7, a control system similar to the one depicted in FIG. 8 could be used, with deletion of the makeup water control and addition of a second gas stream control. The control relationship between the light gas and heavy gas streams might be similar to the control relationship between the crude oil and water streams. Other control arrangements could be used as well.

Inasmuch as the present invention is subject to many variations, modifications and changes in detail, it is intended that all subject matter discussed above and shown in the accompanying drawings be interpreted as illustrative and not in a limiting sense. For example, if the wellstream contains low density particulates, instead of high density sand, the inner rotor of the first centrifuge embodiment shown in FIG. 1 might be eliminated, and the particulates separated and removed along with the water. Also, the first centrifuge embodiment shown in FIG. 1 might be modified along the lines of the second centrifuge embodiment shown in FIG. 7 so that gaseous components of the wellstream can be separated from one another. In addition, the arrangement of scoops, baffles and stationary bars might be modified so that the lighter components are transported to the bottom of the centrifuge and the heavier components to the top. Also, the vertical orientation of the centrifuge might be changed to a horizontal orientation, or some intermediate orientation, in which case the descriptive terms "top" and "bottom" as used herein would be changed. Further, under certain circumstances, it may be beneficial to process a wellstream through a plurality of centrifuges set up in a cascade arrangement. In addition, the method and apparatus of the present invention could be beneficially applied to the processing of streams other than wellstreams. Other variations, modifications and changes in detail will be obvious to those skilled in the art. Such variations, modifications and changes in detail are included within the scope of this invention as defined by the following claims.

What I claim is:

1. A method for separating the components of a stream which is comprised of a first liquid, a second liquid and gas, said first liquid being lighter than said second liquid, said method comprising the steps of:
   (a) introducing said stream into a centrifuge rotor having a rotor wall and opposed first and second end portions;
   (b) rotating said rotor at a speed which creates a centrifugal force sufficient to cause a radial separation of said gas from said liquids, said liquids thereby being forced outward to form a liquid layer adjacent to said rotor wall, said liquid layer being separated from said gas by a liquid/gas interface;
   (c) inducing countercurrent flow in said liquid layer such that the direction of flow adjacent to said interface is toward said first end portion and such that the direction of flow adjacent to said rotor wall is toward said second end portion, said countercurrent flow and said centrifugal force acting together to axially separate said first liquid and said second liquid by forcing said first liquid to flow toward said first end portion and by forcing said second liquid to flow toward said second end portion; and
   (d) extracting said separated first liquid, second liquid and gas from said rotor.

2. The method of claim 1 wherein said stream is a wellstream, wherein said first liquid is crude oil, and wherein said second liquid is water.

3. The method of claim 1 wherein said stream is further comprised of particulates, wherein said particulates are separated along with said second liquid from said first liquid and said gas, and wherein said particulates are extracted along with said second liquid from said rotor.

4. The method of claim 3 where said stream is a wellstream, wherein said first liquid is crude oil, and wherein said second liquid is water.

5. The method of claim 1 wherein said gas is comprised of heavy gas and light gas, wherein said method further comprises the step of inducing countercurrent flow in said gas such that the direction of flow adjacent to said interface is toward said second end portion and such that the direction of flow further inward from said interface is toward said first end portion, said countercurrent flow and said centrifugal force acting together to axially separate said heavy gas from said light gas by forcing said heavy gas to flow toward said second end portion and by forcing said light gas to flow toward said first end portion, and wherein said separated heavy gas and light gas are extracted from said rotor.

6. The method of claim 5 wherein said stream is a wellstream, wherein said first liquid is crude oil, wherein said second liquid is water, wherein said heavy gas is carbon dioxide, and wherein said light gas is hydrocarbon gas.

7. A method for separating the components of a stream which is comprised of a first liquid, a second liquid, gas and particulates, said first liquid being lighter than said second liquid, said method comprising the steps of:
   (a) introducing said stream into a centrifuge having an inner rotor and a primary rotor, said inner rotor being situated inside said primary rotor, said inner rotor having a radially larger portion and a radially smaller portion, said primary rotor having a primary rotor wall and opposed first and second end portions;
   (b) rotating said inner rotor to create a centrifugal force sufficient to force said particulates into said radially larger portion of said inner rotor;
   (c) extracting said separated particulates from said radially larger portion of said inner rotor;
   (d) continuing to introduce said stream into said inner rotor, thereby causing said first liquid, said second liquid and said gas to flow out of said inner rotor and into said primary rotor;
   (e) rotating said primary rotor to create a centrifugal force sufficient to cause a radial separation of said gas from said liquids, said liquids thereby being forced outward to form a liquid layer adjacent to said primary rotor wall, said liquid layer being separated from said gas by a liquid/gas interface;
   (f) inducing countercurrent flow in said liquid layer such that the direction of flow adjacent to said interface is toward said first end portion and such that the direction of flow adjacent to said rotor wall is toward said second end portion, said countercurrent flow and said centrifugal force acting together to axially separate said first liquid and said second liquid by forcing said first liquid to flow toward said first end portion and by forcing said second liquid to flow toward said second end portion; and
   (g) extracting said separated first liquid, second liquid and gas from said primary rotor.

8. The method of claim 7 and further comprising the step of injecting water into said inner rotor, said water serving to strip residual crude oil from said particulates prior to extraction of said particulates from said inner rotor.

9. An apparatus adapted for separating the components of a stream which comprises a light liquid, a heavy liquid and a gas, said apparatus comprising:
   (a) a centerpost;
   (b) a primary rotor adapted for rotation about said centerpost, said primary rotor having a primary rotor wall and opposed first and second end portions;

(c) a feed nozzle which is adapted to permit said stream to flow from said centerpost into said primary rotor;

(d) a light liquid scoop which extends outward from said centerpost into said primary rotor at an axial position between said feed nozzle and said first end portion;

(e) a first primary rotor baffle adapted for rotation about said centerpost at an axial position between said feed nozzle and said light liquid scoop;

(f) a heavy liquid scoop which extends outward from said centerpost into said primary rotor at an axial position between said feed nozzle and said second end portion; and (g) a gas scoop which extends outward from said centerpost into said primary rotor for a shorter radial distance than said light liquid scoop.

10. The apparatus of claim 9 wherein said primary rotor wall is frustoconical in shape, wherein said first end portion is at the narrow end of said primary rotor wall, and wherein said second end portion is at the wide end of said primary rotor wall.

11. The apparatus of claim 9 wherein said gas scoop is at an axial position between said first primary rotor baffle and said first end portion.

12. The apparatus of claim 11 wherein said gas scoop is a light gas scoop and wherein said apparatus further comprises a heavy gas scoop which extends outward from said centerpost into said primary rotor at an axial position between said feed nozzle and said second end portion for a shorter radial distance than said heavy liquid scoop.

13. The apparatus of claim 9 and further comprising:
(a) a second primary rotor baffle which is attached to the inside of said primary rotor at an axial position between said feed nozzle and said heavy liquid scoop; and (b) a stationary bar which extends outward from said centerpost into said primary rotor at an axial position between said feed nozzle and said second primary rotor baffle.

14. The apparatus of claim 9 and further comprising:
(a) an inner rotor comprising an inner rotor wall having a radially larger portion and a radially smaller portion, said inner rotor being situated inside said primary rotor at an axial position between said first primary rotor baffle and said heavy liquid scoop, being adapted for rotation about said centerpost, and being adapted to receive flow from said feed nozzle; and (b) a particulate scoop which extends outward from said centerpost into said radially larger portion of said inner rotor.

15. The apparatus of claim 14 wherein said inner rotor is frustoconical in shape.

16. The apparatus of claim 14 and further comprising a makeup water nozzle which extends outward from said centerpost into said inner rotor.

17. The apparatus of claim 16 and further comprising:
(a) a first inner rotor baffle which is attached to the inside of said inner rotor wall at an axial position between said feed nozzle and said particulate scoop, said first inner rotor baffle having a first opening at its outer edge and a second opening which is between said outer edge and said centerpost; and (b) a second inner rotor baffle which is attached to the inside of said inner rotor wall at an axial position between said first inner rotor baffle and said particulate scoop, said second inner rotor baffle having an opening at its outer edge.

18. The apparatus of claim 16 wherein said inner rotor further comprises a frustoconically shaped lip, and wherein the narrow end of said lip is attached to said inner rotor wall.

* * * * *